United States Patent
Hinterberger et al.

(10) Patent No.: US 10,439,253 B2
(45) Date of Patent: Oct. 8, 2019

(54) BATTERY CELL FOR A BATTERY OF A MOTOR VEHICLE, BATTERY, AND MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 150 days.

(21) Appl. No.: 15/549,452

(22) PCT Filed: Feb. 16, 2016

(86) PCT No.: PCT/EP2016/053223
§ 371 (c)(1),
(2) Date: Aug. 8, 2017

(87) PCT Pub. No.: WO2016/131802
PCT Pub. Date: Aug. 25, 2016

(65) Prior Publication Data
US 2018/0026312 A1    Jan. 25, 2018

(30) Foreign Application Priority Data
Feb. 18, 2015 (DE) .................. 10 2015 002 070

(51) Int. Cl.
*H01M 10/42* (2006.01)
*H01M 2/34* (2006.01)
(Continued)

(52) U.S. Cl.
CPC ......... *H01M 10/425* (2013.01); *B60L 3/0046* (2013.01); *B60L 50/64* (2019.02);
(Continued)

(58) Field of Classification Search
CPC .............. H01M 10/4257; H01M 2010/4271
See application file for complete search history.

(56) References Cited

U.S. PATENT DOCUMENTS

2002/0031700 A1 * 3/2002 Wruck .................. H01M 2/28
429/61
2002/0057542 A1 5/2002 Colling
(Continued)

FOREIGN PATENT DOCUMENTS

DE 102010045037 A1 3/2011
DE 102011113798 A1 5/2012
(Continued)

OTHER PUBLICATIONS

Examination Report dated Jul. 24, 2018 in corresponding European Application No. 16 704 459.3; 5 pages.
(Continued)

*Primary Examiner* — Olatunji A Godo
(74) *Attorney, Agent, or Firm* — Maier & Maier, PLLC

(57) ABSTRACT

A battery cell for a battery of a motor vehicle with a battery cell housing in which is accommodated a galvanic element. The battery cell has two electric connections by means of which the battery cell can be electrically connected to at least one other battery cell of the battery. At least one switching element can be transferred by means of a control unit into a switching state in which an electrically conductive connection between an arrester of the galvanic element and of at least one of the electric connections is interrupted. In addition, the invention relates to a battery with a plurality of such battery cells as well as to a motor vehicle with a battery.

7 Claims, 2 Drawing Sheets

(51) Int. Cl.
  *H01M 10/48* (2006.01)
  *H02J 7/00* (2006.01)
  *B60L 3/00* (2019.01)
  *B60L 58/10* (2019.01)
  *B60L 50/64* (2019.01)

(52) U.S. Cl.
  CPC ............... *B60L 58/10* (2019.02); *H01M 2/34* (2013.01); *H01M 2/345* (2013.01); *H01M 2/347* (2013.01); *H01M 2/348* (2013.01); *H01M 10/4257* (2013.01); *H01M 10/48* (2013.01); *H01M 10/484* (2013.01); *H02J 7/0031* (2013.01); *H01M 2010/4278* (2013.01); *H01M 2200/00* (2013.01); *H01M 2200/10* (2013.01); *H01M 2220/20* (2013.01); *Y02T 10/7005* (2013.01); *Y02T 10/705* (2013.01)

(56) References Cited

U.S. PATENT DOCUMENTS

| | | |
|---|---|---|
| 2006/0152190 A1 | 7/2006 | Riemschneider et al. |
| 2011/0109275 A1* | 5/2011 | Taniguchi ............. H01M 10/44 320/145 |
| 2012/0242144 A1 | 9/2012 | Chorian et al. |
| 2012/0243130 A1 | 9/2012 | Gaben |
| 2013/0002260 A1 | 1/2013 | Golubkov |
| 2013/0249317 A1 | 9/2013 | Kang et al. |
| 2014/0028322 A1 | 1/2014 | Tzivanopoulos |

FOREIGN PATENT DOCUMENTS

| | | |
|---|---|---|
| DE | 202013103445 U1 | 9/2013 |
| DE | 102012210595 A1 | 12/2013 |
| DE | 102013201345 A1 | 7/2014 |
| DE | 102013007099 A1 | 10/2014 |
| DE | 112012005805 T5 | 10/2014 |
| DE | 102013220609 A1 | 4/2015 |
| EP | 2306485 A1 | 4/2011 |
| JP | 2006-506787 A | 2/2006 |
| KR | 10-2012-0075398 A | 7/2012 |
| KR | 10-2012-0095893 A | 8/2012 |

OTHER PUBLICATIONS

Korean Office Action dated Oct. 12, 2018, in connection with corresponding KR Application No. 10-2017-7026154 (12 pgs., including machine-generated English translation).

Notification of Transmittal of Translation of the International Preliminary Report on Patentability dated Aug. 31, 2017, in connection with corresponding international application No. PCT/EP2016/053223 (8 pages).

Examination Report dated Dec. 8, 2015 of corresponding German application No. 102015002070.6; 6 pgs.

International Search Report dated Apr. 18, 2016 of corresponding International application No. PCT/EP2016/053223; 14 pgs.

* cited by examiner

BATTERY CELL FOR A BATTERY OF A MOTOR VEHICLE, BATTERY, AND MOTOR VEHICLE

FIELD

The invention relates to a battery cell for a motor vehicle. The battery cell comprises a battery cell housing in which is accommodated a galvanic element. The battery can be electrically connected by means two electric connections with at least one other battery cell of the battery. In addition, the invention relates to a battery provided with a plurality of such battery cells and to a motor vehicle with a battery.

BACKGROUND

It is known from prior art, for example from DE 10 2010 045, that a plurality of battery cells can be provided interconnected so as to supply a specified voltage or a specified current to a battery. Such batteries are nowadays used in particular as traction batteries in motor vehicles such as electric vehicles or hybrid vehicle to provide electric drive energy.

With such battery cells, a so-called current interrupt device (CID) can be provided. Such a current interrupt device is provided to trigger an interruption with an excessive current flow, which is to say with an outer short-circuit and additionally or alternative with an increased internal pressure in the battery cell housing. As a result, flowing of the current through the battery cell is prevented, so that there will be no further warming of the battery cell. In this manner, other chemical reactions can be fueled or amplified and a so-called "thermal runaway" of the battery cell is avoided. At the same time, however, the function of the battery cell the discharging or receiving of the electric current, is no longer provided.

In the case of commercially available battery cells, such as those that are used for traction batteries of motor vehicles, a current interrupting device can be provided such as the one illustrated in the reference of FIG. 1 In a schematically illustrated battery cell 10 is in this case partially indicated a battery cell housing 12, in which is arranged a galvanic element 14. Between an arrester 16 of the galvanic element 14 and an electric connection 18 of the battery cell 10 is arranged the current interrupting device 20 which in the case of the battery cell 10 comprises a metal sheet 22 which can be deformed as a result of external influences. The metal sheet 22 accordingly functions as a bimetal element whose deformation depends on the temperature. In the initial state, the metal sheet 22 is also connected at the arrester 16 as shown in FIG. 1. However, with an increased temperature or with an increased pressure, the metal sheet 22 becomes arched within the battery cell housing 12, for example as a result of the development of gas.

This is further illustrated in FIG. 2. As a result, an electrically conductive connection between the arrester 16 and the electric connection 18 in interrupted. The arrester 16 is a part of an electrode of the galvanic element 14, which in addition to the arrester 16 comprises also a chemically active material (not shown in the figure) of the electrode.

Furthermore, EP 2 306 485 A1 describes a battery cell with a current interrupting device which is formed as a fuse. With the melting of for instance a zinc material, the contact between an arrester of a galvanic element and an electric connection or a pole of the battery cell is permanently interrupted.

The fact such current interrupting devices must be viewed as comparatively expensive components is to be regarded as a disadvantage of these battery cells. In addition, a number of compromises must be addressed in the design of such current interrupters. The triggering function is in particular comparable to the function of an electric fuse. Accordingly, the pressure, the temperature and the intensity of the current, as well as the time period over which such large variables are present play an important role with respect to the triggering conduct. As a result, corresponding characteristic curves of these parameters overlap and hysteresis can occur. The result is that an exact triggering threshold value can be predetermined only with difficulty. It is indeed difficult to take into account as much as possible also the interaction of the different factors. Moreover, trying to make a suitable adjustment for each battery cell type with respect to these factors is very laborious as well.

In addition, such a mechanical current interrupting device can be triggered only once. In other words, the current interrupting device cannot be reset after it has been triggered and the current interruption is therefore irreversible. Moreover, such a mechanical component requires a great precision for the manufacturing of the battery cell so that the current interrupting device could perform its desired function.

With a battery cell provided with a current interrupting device which causes triggering also in the case when the internal pressure rises in the battery cell housing, so-called overcharging additives are as a rule also used. Such additives lead with overcharging of the battery cells to releasing of gases and to an increase of internal pressure. Moreover, the introduction of such overcharging additives is not desirable because an increase of the internal pressure in the battery cell housing should be prevented as much as possible. Overcharging additives in addition also lead to a slow, constant increasing of the pressure in the interior of the battery cell housing. As a result, during the course of time and in particular at a point in time that cannot be predicted, an undesirable triggering of the current interrupting device occurs.

That is why there are also battery cells without a current interrupting device which do not contain gaseous additives intended to prevent the pressure in the cells from being unnecessarily increased. That is why current interrupting devices and their advantages and disadvantages are passionately and controversially discussed. The problem is that on the one hand, the current interrupting device of the battery cell should be as reliable and as robust on possible. On the other hand, the current interrupting device should be also as sensitive with respect to triggering as possible.

SUMMARY OF THE DISCLOSURE

The object of the present invention is to provide a battery cell, a battery and a motor vehicle of the type mentioned in the introduction that is improved with respect to the interruption of the current in the battery cell.

The battery cell according to the invention comprises at least one switching element, which can be transferred by means of a control unit into a switching state in which an electrically conductive connection between an arrester of the galvanic element and at least one electric connection is interrupted. An intelligent battery cell or a so-called "smart cell is obtained by providing a control unit by means of which the switching element can be transferred into the open switching state by activating the switching element. This is because particularly the criteria can be specified by means of a control unit in a particularly simple manner, wherein at least one switching element is connected in this manner when the criteria are fulfilled so that the electrically conducting connection is interrupted. This means that it is thus possible to specify or program the exact triggering of the switching element by means of intelligence. Accordingly, the battery cell is improved in particular with respect to the current interruption.

Furthermore, multiple triggering of the switching element is also possible. This is because the switching element can be transferred again into a switching state in which the electrically conductive connection between the arrester and at least one electric connection of the battery cell is established again. The interruption of the electrically conductive connection is therefore reversible so that the switching element can be activated again for another triggering.

The control unit also makes it possible to take into account development of new generations of battery cells or modification of battery cells by setting triggering criteria that are adapted to battery cells of this type by means of corresponding programming of the control unit. The interruption of the electrically conductive connection can thus be particularly easily adapted to new circumstances, and in particular both already during the manufacturing of the battery cell and subsequently when the battery cell is used, for example in a battery of a motor vehicle.

It is also possible to provide a switching element which can be connected between each of both arresters and the respective electric connection by means of the control unit. A particularly secure separation of the battery cells from other battery cells of the battery can thus be achieved in this manner.

It is possible to design the switching element as a relay. A particularly secure galvanic separation can be achieved in this manner. However, such a mechanical operating component requires a relatively large amount of installation space to be available inside the battery cell. That is why it is preferred when at least one switching element is designed as a semiconductor element. Such a semiconductor element can be transferred very quickly and an a particularly simple manner into the desired switching state, while the amount of energy that is required for this purpose by the control unit is extremely small. In addition, a combination of a relay with a semiconductor element can be also provided so as to make it possible to interrupt the electrically conductive connection particularly quickly as well as particularly safely.

In order to provide the advantageous properties of a semiconductor element, it is possible to use for a switching element for example a power dissipation switch with a reverse diode, for instance a field effect transistor, in particular a MOSFET (metal-oxide semiconductor field effect transistor), preferably a power MOSFET. An electronic relay with two field effect transistors (in particular with two MOSFETs) which are connected anti-serially and in which the field effect transistors that are connected in series are reverse diodes with passage enabled in opposite directions can be also provided on the path between the arrester and at least one of the electric connection as a switching element. This makes it possible to ensure the interruption of the electrically conductive connection in a particular safe manner. Additionally or alternatively, at least one switching element can be designed as a gallium nitride switch (GaN switch) or a similar switching element provided with such material which has a wide band gap, for example in the form of silicon carbide.

Such semiconductor elements have considerable advantages with respect to the electrical properties, in particular with respect to the large current density or power density that can be achieved per a semiconductor element. In addition, a particularly compact switching element can thus be provided. Moreover, the switching element can thus also enable particularly high switching speeds, in particular cut-off speeds, for example of several hundred kHz (and more). The current interruption can thus occur particularly rapidly. Such semiconductor switches also allow particularly high operating temperatures of up to 250 degrees Celsius without causing irreversible damage to the switching element. Moreover, a particularly low throughput resistance can be realized with the semiconductor elements mentioned above which are accompanied by desirable low switching losses.

In particular, at least one switching element can be designed as a so-called gate injection transistor (GIT), for example as a GaN transistor of the self-blocking type. Such a a GaN transistor is in particular provided with the advantageous properties to a particularly high extent. Such a switching element does not allow any current to pass through without a control voltage at the gate connection. Such a switching element is also without the control voltage in the off-state in which the electrically conductive connection is interrupted. This is advantageous for safety reasons.

The semiconductor device, such as a power transistor, can be designed in such a way that it has only two switching states, in particular a switching state in which the electrically conductive connection is interrupted and another state in which the electrically conductive connection is established between the arrester and the electric connection. This makes the design of the semiconductor element simple and the switching of the semiconductor element is particularly simple.

It is preferred when the control device is arranged in the interior of the battery housing. The control device is then well protected. In addition, signals from sensors which detect parameters of the battery cell and are for this purpose also located inside the battery cell housing can be supplied to the control unit particularly well in this manner.

It has also been proven advantageous when at least one parameter can be detected by means of the control unit from a group which comprises the current density of a current flowing through battery cell. In this case, the control unit is designed to transfer at least one switching element into the switched state as a function of at least one parameter, in which the electrically conductive connection between the arrester of the galvanic element and the at least one electric connection is interrupted.

So for example, it can be ensured that with high short-circuiting currents, for example with a current density of 2 kA to 4 kA, secure and in particular multiple separations of the galvanic element occur between the connections and the battery poles so that the disconnection of the battery will also take place.

Additionally or alternatively, for example a temperature can be detected as at least one parameter for example by means of a sensor unit that is coupled to the control unit. In this manner, when for example a threshold value is exceeded, at least one switching element is transferred to the switched state in which the electrically conductive connection is interrupted. The battery can thus be switched off particularly safely in particular in the case of a short-circuit or with a thermal runaway.

Even in the case of a temperature load that is coming from outside of the battery cell, which is to say in the case of a heat impact which is not caused by the processes within the battery cell, the control unit can control the switching element for safety purposes and interrupt the electrically conductive connection. This can be for example the case when as a result of a fire of another batter cell or of another component of the battery (or of a component adjacent to the battery), the input of heat occurs in the battery cell.

Information about such thermal stresses which occur in the in the battery cell or in the vicinity and which have an impact on the battery cell can be preferably communicated by means of the control unit, for example a superordinate control device of the battery. Additionally or alternatively, such information can be stored in a storage device and read out when needed.

It has been also found to be advantageous when by means of a sensor coupled to at least one control unit, or by means of the control unit itself, a voltage and/or pressure and/or mechanical stresses and/or a condition of the electrolyte of the galvanic element and/or acceleration can be detected, wherein the control unit is designed to open a switching element as a function of at least one such parameter.

So for example when a threshold value of such a parameter, or when such a parameter of the electrically conductive connection is exceeded, the electrically conductive connection between the arrester and the electric connection is interrupted. In this manner, it is possible to ensure in particular that a faulty battery will be galvanically separated from a battery cell connection of the battery cell construction.

In particular, protection against overloading can be provided so that for example if for instance the maximum temperature value is exceeded, or if the current density or the voltage is exceeded, the battery cell is turned off. Such self-triggering of the battery cell can be also realized in the form of a fuse so that it is activated when a maximum value is exceeded, for example a maximum value of the temperature, or of the current density, pressure or the like.

Another factor contributing to the safety of the battery cell is that when depending on the acceleration, at least one switching element is switched on in such a way that the electrically conductive connection is interrupted. So for example in the case of a motor vehicle that is equipped with the battery, the battery cell are switched to a voltage-free state in the case of an impact.

Depending on the data that is acquired by at least one sensor or by a control device, many triggering criteria can be taken into account for a safe triggering of the current interruption.

The corresponding sensors can in this case detect the parameters discussed above within the battery cell housing. Additionally or alternatively, it is also possible to provide sensors which detect conditions present outside of the battery cell housing based on at least one parameter. By taking into account a plurality of the conditions inside and/or outside of the battery cell housing, the parameters described above can be preset which are well adapted to the respective situations, so that a reliable interruption of the electrically conductive connection is always ensured. A particularly safe intelligent battery cell ("a Safe SmartCell") is thus created. The corresponding triggering criteria can be stored in characteristic curves or characteristic fields, for example in a storage module or in a storage unit. The aging of the battery cell can be in particular taken into account when changing the characteristic curves or characteristics fields.

It is preferred when the control unit is provided with an interface by means of which a threshold value of at least one parameter can be changed, wherein when it is exceeded, at least one switching element is transferred into the switched state. The triggering criteria can be in particular adjusted by modifying the characteristic curves or characteristic fields.

So for example the changes of the battery cell over the lifespan of the battery cell can be taken into account. The triggering criteria are therefore not input once and therefore only static, but instead they are dynamic and they can be changed to match changing circumstances. This makes the triggering of the current interruption particularly flexible. Although an adaptation of the triggering criteria can be achieved by replacing the control unit, it is clearly less expensive when such changes are carried out with the interface of the control unit.

It has been further also shown advantageous when the control unit is designed to transmit information to a superordinate control device of the battery and/or to receive commands that are issued by the superordinate control device. The interface of the control unit can be used in particular for this purpose.

In this respect, communication over a wired line and/or wireless communication can be provided. So for example, an error and/or the respective switched state of the switching element of the superordinate control device, such as of a battery management system, can be communicated. In addition, the superordinate control device can issue commands for the control unit of the battery cell. So for instance, an electrically conductive connection can be implemented by the control unit in particular in view of the state of the entire battery, which controls the switching element.

The control unit, which is designed for communication with the superordinate control device of the battery, enables also data exchange of other battery cells which are networked with each other. For example, a plurality of battery cells, in particular all battery cells with which the triggering criteria have been fulfilled, can be deactivated for example for safety reasons. Accordingly, the switching element of only those battery cells will be transferred into the switched state in which the electrically conductive connection between the arrester and the electric connection is interrupted.

It is further also advantageous when the control unit is coupled to a galvanic element in order to provide the control unit with electric energy. This is because the control unit then obtains the electric energy that is required for connecting the switching element directly from the battery cell. This is not problematic with respect to the energy provided by the battery cell because the control unit requires only a very small amount of energy, which is why a low-power design is preferred, in particular an ultra-low-version thereof.

Additionally or alternatively, the control device can be coupled to an electric energy storage device, for example a capacitor arranged in the battery cell housing. When such a separate energy storage device is provided, the electric energy that is supplied by the galvanic element of the battery cell can be provided to the control unit independently. Therefore, safe switching of the switching element and thus also the interruption of the current flow can always be ensured.

In particular, such an electric storage device can be charged already during the charging of the battery cell. When a plurality of battery cells comprised in motor vehicle are used, this can occur for example during the so-called recuperation operation. However, the separate energy storage device can be also charged at the same time when the battery is connected to a source of current.

Finally, it has also proven advantageous when the control unit is adapted to check the functionality of the at least one switching element. A self-diagnostic function can also be integrated in the control unit, wherein at least one switching element is checked for example in time intervals that can be predetermined. For this purpose, the measurements of the control unit can be carried out on the switching element, which thus provides information about its status.

Such an independent diagnosis can be provided in predefinable, programmable time intervals, or it can be initiated externally. For example, such querying of the status of the switching element or of its functionality can be initiated by an external control device, for example in the form of a microprocessor of a battery management system. So for example, a permanent interruption of the electrically conductive connection can be employed in the event of a fault of the switching element. On the other hand, it can be also determined by checking the switching element whether the switching element can be reliably transferred to a switching state that does not allow current to flow through it when it is in the switching state interrupting the electrically conductive connection. The presence of a faulty switching element can be then communicated to an operator and the switching element can be replaced as required.

The battery according to the invention includes a plurality of battery cells according to the invention which can be connected in series and/or in parallel.

The motor vehicle according to the invention includes at least one battery according to the invention. The motor vehicle can be designed for example as a personal automobile, in particular an electric motor vehicle or a hybrid motor vehicle. In addition, the motor vehicle may be also an electrically operated motorcycle or an electrically operated bicycle.

It is further also possible to provide the battery in a stationary energy storage system. Moreover, it can be also provided that the battery that was provided in a motor vehicle is reused as a so-called second-life battery, which means that the battery is reused for a different type of use. In particular with second-life applications, the requirements on the performance and capabilities of the battery cells may be lower than the requirements on battery cells that are used for batteries in a motor vehicle.

The described advantages of the battery cells according to the invention and preferred embodiments apply also to the battery according to the invention and to the motor vehicle according to the invention.

The features and feature combinations described above, as well as the features and combinations described below in the description of figures and/or in the figures alone can be used not only in the particular indicated combination, but also in other combinations or alone without deviating from the scope of the invention. The embodiments are therefore to be considered as being encompassed and disclosed in the invention even when they are not explicitly shown in the figures or discussed, but can result and be produced from separate combinations of the features based on the explained embodiments.

BRIEF DESCRIPTION OF THE DRAWINGS

Other advantages and details of the invention will become evident from the claims and from the following description of preferred embodiments, as well as from the attached figures which show the following:

DETAILED DESCRIPTION OF THE DRAWINGS

Figure 1:
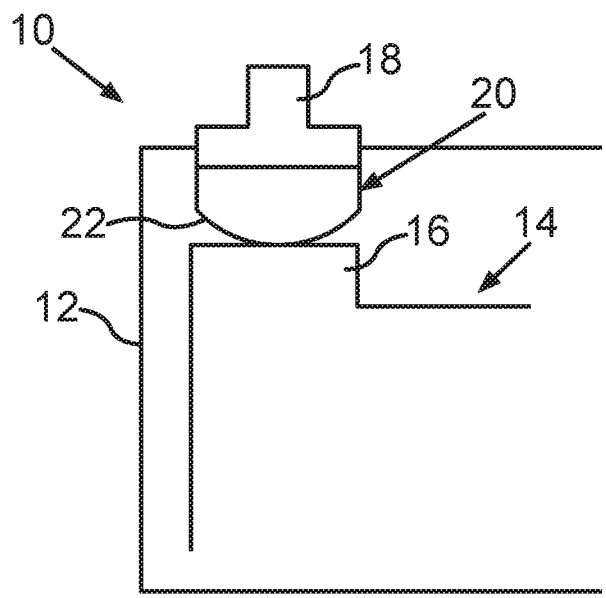
FIG. 1 a schematic illustration of a section of a battery cell with a current interrupt device according to prior art.
Figure 2:
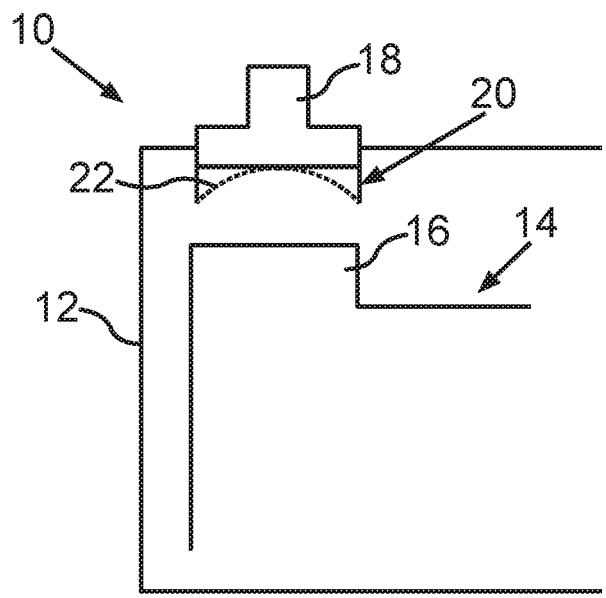
FIG. 2 the battery cell according to FIG. 1, which, however, shows a triggered current interrupting device.
Figure 3:
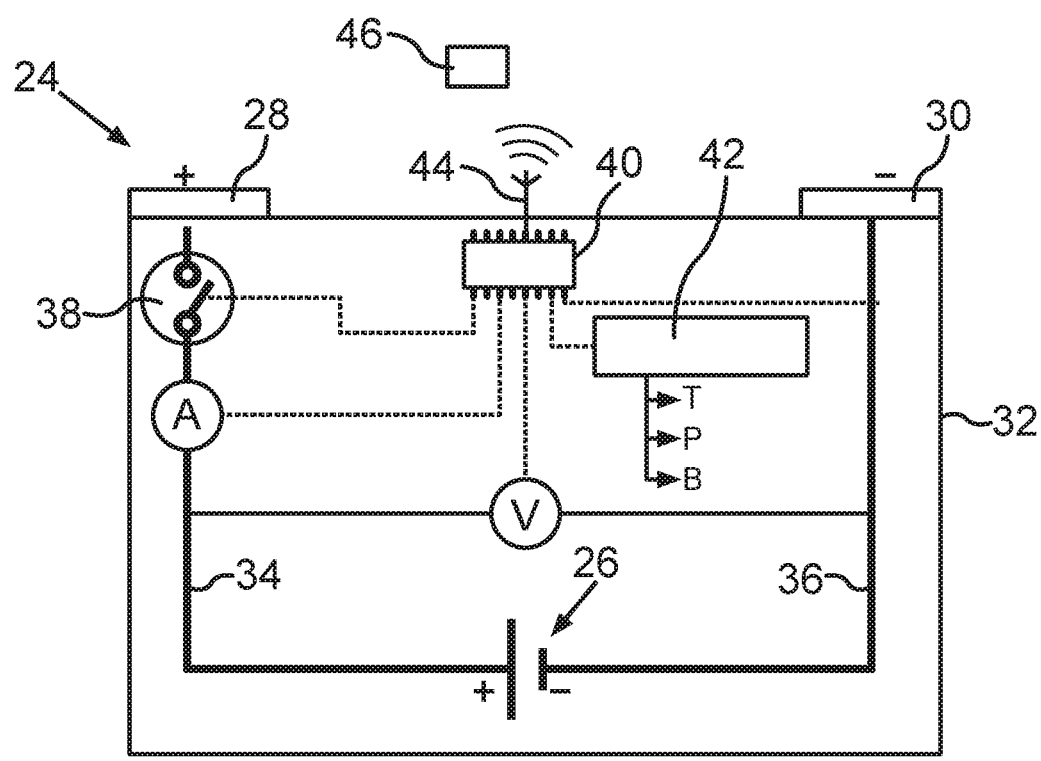
FIG. 3 a schematic view of a battery cell with an electronic current interrupt device, wherein a semiconductor switching element is controlled by a control device in order to interrupt an electrically conductive connection between an arrester of a galvanic element of the battery cell and one of the electric connections of the battery cells.

Reference is made to the battery cell 10 shown in FIG. 1 and FIG. 2 according prior art and to the description provided in the introduction. FIG. 3 shows schematically an improved battery cell 24, which is also provided with a current interruption device. The battery cell 24 can be designed for example to be used as a battery in a motor vehicle, for example as a lithium-ion battery. In a battery such as a traction battery that is used in a motor vehicle, a plurality of such battery cells 24 are generally electrically connected in series and/or in parallel in order to provide correspondingly high voltages and currents.

During the operation of the battery cell 24 can occur situations in which it is advantageous when a current flow which flows from a galvanic element 26 of the battery cell 24 is interrupted at least at one of the two electric connections 28, 30 of the battery cell 24. This is ensured with a switchable or intelligent battery cell 24 which is schematically indicated in FIG. 3.

The battery 24 comprises a battery cell housing 32, which is in the present case provided for example with a prismatic design. The galvanic element 26 is accommodated in the interior of the battery cell housing 32. The galvanic element 26 comprises arresters 34, 36 which are respectively coated with an electrochemically active material. For simplification, in the present case is indicated only the arrester 34 which to the first electric connection 28 (for example a plus pole), and the arrester 36 which leads to the second electric connection 30 of the battery cell 24. An electrically conductive connection can be interrupted between at least by one of the arresters 34, 36 and one of the connections 28, 30, so that the switching element 38 is opened. In the present case, the switching element 38 is arranged for example in the electrically conductive connection between the arrester 34 of the galvanic element 26 and the connection 28 forming the plus pole of the battery cell 24. In an alternative embodiment, however, such a switching element 38 can be provided so that the arrester 36 can be also separated from the electric connection 30.

In order to control the switching element 38, which is formed for example from a semiconductor element, a control unit 40 is provided, which is in the present case arranged within the interior of the battery cell housing 32. Depending on the design of the switching element 38, the control unit 40 can be used to ensure that the when the control voltage applied to the switching element 38, an electrically conductive connection is interrupted or established between the arrester 34 and the connection 28. With the interaction of the switching element 38 with the control unit 40, an electronic current interruption device is obtained, wherein intelligent control is provided for the semiconductor element.

This makes it possible in particular to program an exact triggering, which is to say to preset a parameter that will be taken into consideration for the determination as to whether the control unit 40 should cause an opening of the switching element 38.

For this purpose, the control unit 40 is in the present case coupled to sensors 42 which can detect a plurality of parameters. In the present case, sensors 42 are shown schematically which are arranged inside the battery cell housing of the battery and which thus detect the corresponding parameters inside the battery cell housing 32. These parameters can include for example a temperature, a pressure, accelerations (which can be detected for example by means of a force sensor), mechanical stresses or the composition of an electrolyte of the galvanic element. The control unit 40 is additionally itself capable of detecting a current flowing through the battery cell 24 as well as the voltage that is applied to the arresters 34, 36. Based on the measured values detected directly from the sensor data as well as by means of the control unit 40, a plurality of triggering criteria can be taken into account in order to transfer the switching element 38 into an open switching state in which the electrically conductive connection between the arrester 34 and the electrically conductive connection between the arrester 34 and the electric connection 28 is interrupted.

Additionally or alternatively, the sensor (not shown) can detect parameters that are present outside of the battery cell housing 32, such as a temperature, or accelerations, as well as in particular the value of the current intensity and of the voltage. These measured values can be also taken into consideration for determining the triggering criteria.

In addition, by providing the control unit 40, it is also possible to dynamically adjust and modify the lifespan of the battery cell 24 over and above the triggering criteria. For this purpose, the control unit 40 can be provided with an interface 44, which allows a corresponding reprogramming of the control unit 40.

Because the control unit 40 is provided which controls the switching element 38, multiple triggering of the switching element 38 is further also enabled, as well as a reversible reactivation of the switching element 38. The semiconductor element can be in particular transferred into the switching state in which the electrically conductive connection between the arrester 34 and the connection 28 is established.

The control device 40 can additionally also transmit information by means of the interface 44 to a superordinate control device 46 of the battery, which can be for example designed as a battery management system. Moreover, commands can be transmitted from the superordinate control unit 46 to the control unit 40. Such networking of a plurality of battery cells 24 and exchanging of data between them makes it in particular possible to deactivate a plurality of included battery cells 24, for example for safety reasons.

In particular when a new generation of the battery cells 24 is being developed or when existing battery cells are being modified, the triggering criteria can be adjusted to new circumstances with simple programming of the control unit 40. This can be carried out for example during the manufacturing of the battery cell 24, but also during an operation which is used to produce battery cells 24 to be used in particular in a battery for a motor vehicle. It is also possible to perform an update of such triggering criteria for a battery comprising the battery cells 24 within the context of the warranty.

In addition, there are also advantages related to the cost when at least one switching element 38 is used for different types of battery cells 24 in integrated electronic components with the triggering conduct that can be determined and programmed particularly based on the type of the battery cell 24.

The invention claimed is:

1. A battery module of a motor vehicle, comprising:
    a battery cell housing, in which a galvanic element is accommodated, and with two electric connections by which the battery cell can be electrically connected to at least one second battery cell, wherein the battery cell and the at least one second battery cell are arranged in the battery module of the motor vehicle,
    wherein at least one switching element can be transferred by a control unit, and wherein an electrically conductive connection between an arrester of the galvanic element and at least one of the electric connections is interrupted,
    wherein each of the battery cell and the at least one second battery cell includes the control unit, and
    wherein the control unit is configured to transmit information to a superordinate control device of the battery module and to receive an instruction issued by the superordinate control device.

2. The battery module according to claim 1, wherein the at least one switching element is designed as a semiconductor element.

3. The battery module according to claim 1, wherein the control unit is arranged inside the battery cell housing.

4. The battery module according to claim 1, wherein by the control unit and by at least a sensor which is coupled to the control unit, at least one parameter can be detected from a group of parameters which comprises:
    a current density of a current flowing through the battery cell;
    a temperature;
    a voltage;
    a pressure;
    a mechanical stress;
    a condition of an electrolyte of the galvanic element; and
    an acceleration,
    wherein the control unit is designed to transmit depending on the at least one parameter of the at least one switching element into the switching state in which the electrically conductive connection between the arrester of the galvanic element and the at least one electric connection is interrupted.

5. The battery module according to claim 4, wherein the control unit is provided with an interface, which can be used to modify a threshold value of the at least one parameter, so that when the threshold value is exceeded, the at least one switching element is transferred into the switched state.

6. The battery module according to claim 1, wherein in order to supply the control unit with electric energy, the control unit is coupled to the galvanic element and to an electric energy storage device.

7. The battery module according to claim 1, wherein the control device is designed to check the functionality of the at least one switching element.

* * * * *